Feb. 19, 1946. I. FIORI 2,395,178
ADJUSTABLE SUPPORT STRUCTURE
Filed June 7, 1943 2 Sheets-Sheet 1
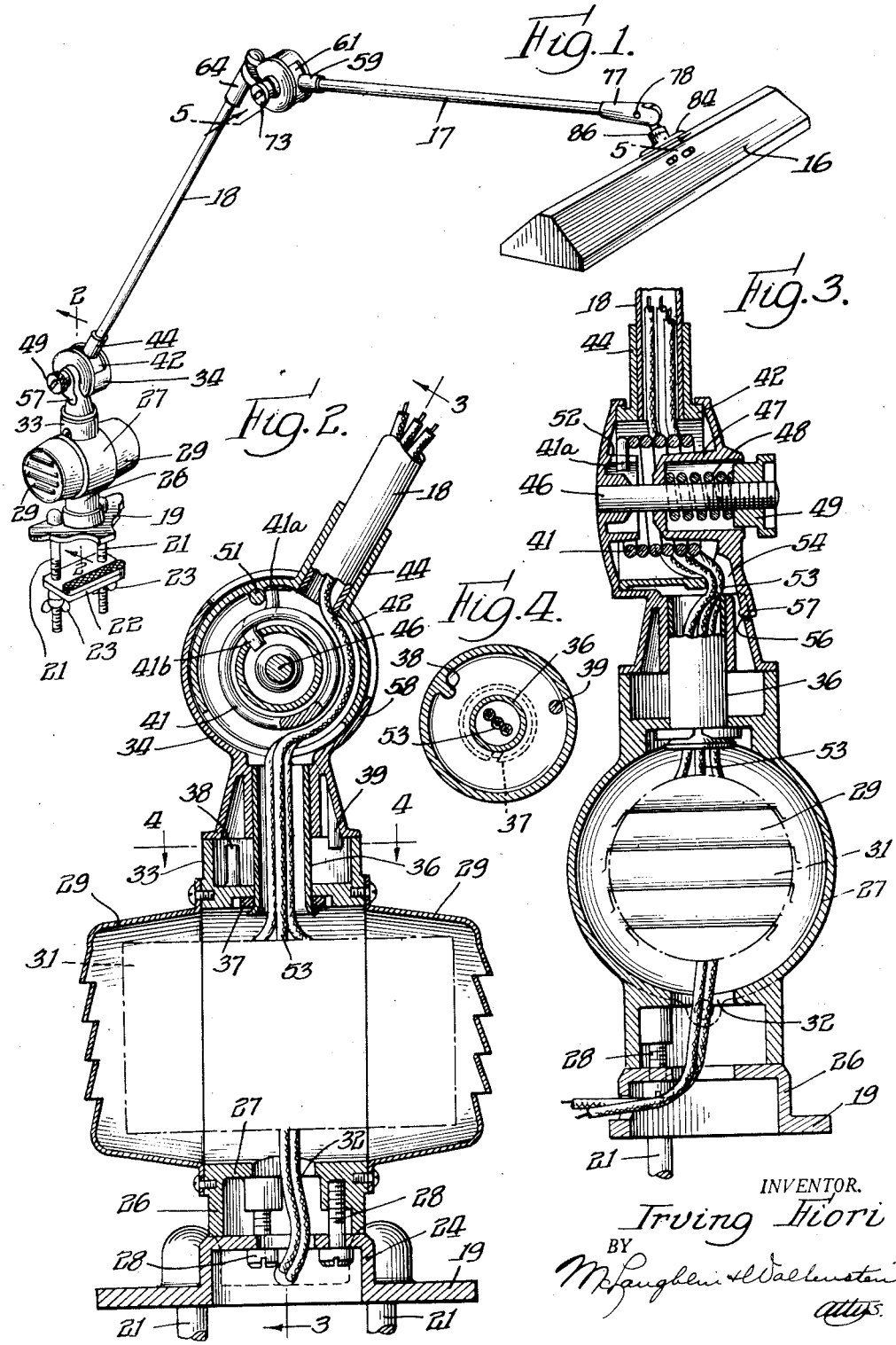
INVENTOR.
Irving Fiori
BY
McLaughlin & Wallenstein
Attys.

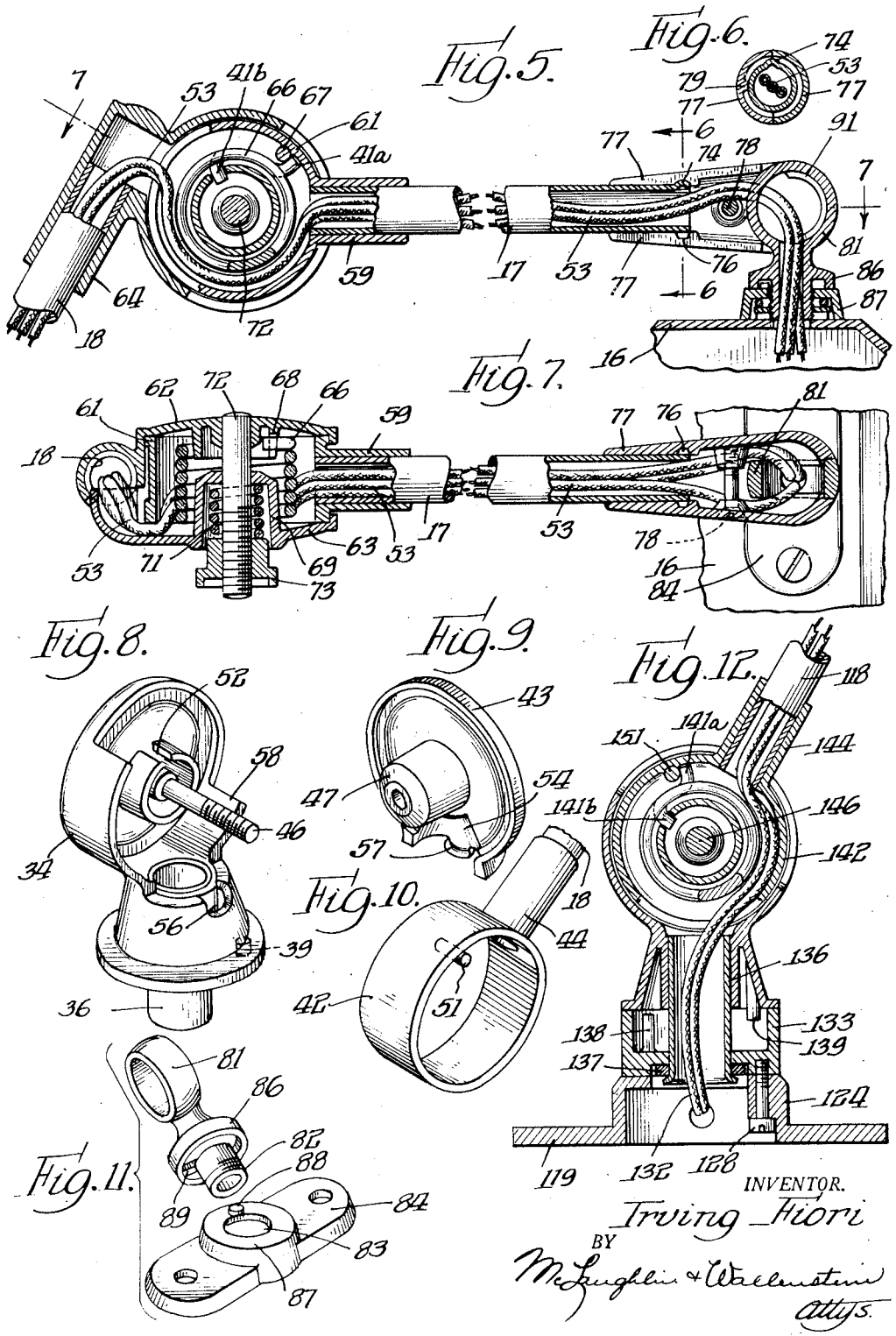

Patented Feb. 19, 1946

2,395,178

UNITED STATES PATENT OFFICE 2,395,178

ADJUSTABLE SUPPORT STRUCTURE

Irving Fiori, Chicago, Ill., assignor to Art Specialty Co., Chicago, Ill., a corporation of Illinois Application June 7, 1943, Serial No. 489,941

5 Claims. (Cl. 248—280)

My invention relates to adjustable load carrying support structures and, more in particular, to a lamp bracket combination wherein the construction and arrangement of the lamp support is such as to permit ready adjustment of the lamp to substantially any position.

Adjustable load carrying supports, intended for supporting lamps and similar objects, generally speaking, are provided with a fastening and releasing mechanism when the position of the supported load is variable and they, therefore, have the objection that two hands are necessary for the purpose of operating them. A common arrangement is to support one or more adjustable parts on a pivot, the friction of which is controlled by a thumb nut, it being necessary to release the thumb nut before moving the load carrying bracket, such as a pivoted arm, and to tighten the thumb nut after the bracket has been moved to the position desired.

In another method of mounting an adjustable support, the overhanging load, such as of a lamp or the like, is counterbalanced by means of an opposed load mounted on the opposite side of a pivot, the opposed load being, for example, a spring or weight. The use of a compensating spring or weight, generally speaking, has been successful only in those instances where the pivoted supporting member comprises only a single arm, or wherein, if two arms are employed, articulated with respect to each other, the movements are relatively simple and the load carried on the extending bracket is relatively small.

Patent No. 2,200,518 discloses an adjustable bracket structure wherein only a single spring is provided to counterbalance an entire bracket structure, the spring being effective not only with respect to the entire bracket but also with respect to separate arms of the bracket, articulated with respect to each other. The single spring arrangement of this patent has certain disadvantages, particularly in that at certain positions of the bracket device the tension on the spring is decreased while the load placed upon it is increased; in other words, the counterbalancing effect of the spring is decreased when the position of the parts requires the counterbalancing effect to be increased. The effect of this arrangement is that greater friction is required at the pivots, and the fact that this friction is taken up at a plurality of joints does not avoid the fact that the problem of unequal counterbalancing effect remains when an adjustable bracket structure is employed for the support of an electric lamp. It is, however, essential that electric wires be carried to the lamp, preferably through tubing comprising a part of the bracket structure itself. In the patent referred to, a single counterbalancing spring is provided, apparently to leave the joint portions of the bracket free so that an electric conductor can be passed therethrough and also because of the structural problems involved in counterbalancing the load at two points and in such a way that as the load increases, the tension of the counterbalancing spring will also increase.

In my invention, I not only overcome the difficulties encountered in the production of adjustable bracket structures heretofore produced but I, moreover, produce an adjustable support structure which is relatively inexpensive to manufacture, which can be operated for long periods of time without difficulty and which, withal, has a neat and attractive appearance. The device of my invention has the advantage that it may be adapted to the support of lamps of various types or other objects than lamps and when the load supported varies, the counterbalancing mechanism may readily be adapted to the new load.

The principal object of my invention is the production of an improved adjustable support structure which is free of the disadvantages discussed hereinabove.

Other details and specific objects and features of my invention, however, will be apparent from the detailed description below.

The drawings illustrate one embodiment of my invention wherein—

Fig. 1 is a perspective view showing the adjustable support of my invention as a support for a lamp structure in which a luminescent tube is the light source, Fig. 2 is an enlarged fragmentary sectional view taken on the line 2—2 of Fig. 1, looking in the direction of the arrows, Fig. 3 is an irregular sectional view taken on the line 3—3 of Fig. 2, Fig. 4 is a plan sectional view taken on the line 4—4 of Fig. 2, looking in the direction of the arrows, Fig. 5 is a longitudinal sectional view taken through one of the joint portions and including one arm portion of the device of Fig. 1, the section being taken generally along the line 5—5 of Fig. 1, Fig. 6 is a sectional view taken on the line 6—6 of Fig. 5, Fig. 7 is an irregular plan sectional view taken on the line 7—7 of Fig. 5, looking in the direction of the arrows, Figs. 8, 9 and 10 are perspective views of lower pivot members which, when assembled, comprise part of the structure shown in section in Figs. 2 and 3, Fig. 11 is an exploded perspective view showing two of the parts forming part of the support for the lamp housing, and Fig. 12 is a sectional view of a modified form wherein the device supported by the bracket may be of a character not requiring a transformer or other voltage controlling device.

The device of my invention may take various forms. The embodiment of the invention shown in Figs. 1 to 11, inclusive, is shown as including a lamp housing 16 for supporting a luminescent tube or tubes, two arms 17 and 18, and a lower mechanism adapted to carry a transformer and so constructed and arranged as to be clamped to a plane surface, for example, to the edge of a drafting table. The parts indicated are separated by hinge members and the arms 17 and 18, with the hinge members, are so constructed and arranged that an electrical conductor may extend from the transformer to the lamp housing without being exposed at any point.

Looking first to the support, I provide a bracket 19 carrying a pair of downwardly extending bolts 21 on which is supported a clamping plate 22, the bolts 21 being threaded and thumb nuts 23 being employed to tighten the clamping plate against the underside of a table or the like. The bracket 19 is provided with a boss 24 on which is supported an annular lower projection 26 forming a ring housing member 27, cap screws 28 holding the projection 26 and its integral ring member 27 in position. On opposite sides of the ring member 26, housing members 29 may be attached such as by machine screws, as shown, the ring 27 and housing members 29 together comprising the housing for a power unit 31. The boss 24 is apertured to receive a pair of conductors 32 as of an incoming commercial line and the ring 27 is apertured at the center of the annular projection 26 and in line with a corresponding top aperture in the boss 24 whereby to permit carrying the conductors 32 to the primary windings of the power unit.

Above the ring housing member 27 is an annular upper projection 33 on which is supported a skirt portion of a bracket hinge member 34, this member being shown in perspective in Fig. 8. The bracket hinge member has integral therewith a tube portion 36 which extends through an aligned central opening in the upper portion of the ring housing member 27 and through a washer 37, the lower end of this tube 36 being spun over, as shown in Fig. 2 to hold the parts together. Thus, rotary movement on a vertical axis is permitted between the assembly comprising the projection 33 and the remaining portion of the adjustable bracket structure carried by the bracket hinge member 34. Projections 38 and 39, integral with the housing ring member and bracket hinge member, respectively, are aligned and limit the rotation of the bracket hinge member to slightly less than 360 degrees.

The bracket hinge member 34, because of its construction as indicated in Fig. 8, serves as a portion of a housing for a spring 41, the spring 41 being housed as well by a ring hinge member 42 shown in Fig. 10 and a hinge friction member 43, a portion of which acts as a cover plate. The ring 42 is supported at the lower end of a tube 44 comprising the end of the arm 18 and is held between a portion of the bracket member 34 and hinge friction member 43. As shown particularly in Fig. 3, the ring 42 is so supported that the arm 18 pivots about a point coinciding with the center of a bolt 46 carried by the bracket hinge member 34. The hinge friction member 43 has an inwardly projecting friction spring housing portion 47 through which the bolt 46 passes, this portion 47 comprising a housing for a spring 48, the tension of which is controlled by adjustment of the nut 49.

The spring 41 has tension in torque resulting from the fact that one end 41—a thereof extends outwardly and engages a projection 51 on the inside of ring 42 and the other end 41—b thereof projects inwardly and engages in a recess 52 forming a part of the bracket hinge member 34. The construction and arrangement of the parts is such that when the arm 18 assumes a more horizontal position the tension on spring 41 is increased. Thus, the counterbalancing effect of the spring is increased as the applied load is increased because of the position of the arm 18 and load carried thereby.

Conductors 53, comprising the leads from the power unit to the lamp 16, pass upwardly through the tube 36 in the manner shown in Figs. 2 and 3. A portion of the hinge friction member 43 is recessed as shown at 54, to permit passage of the conductors 53 around the ring hinge member 42 and into the open space between the ring hinge member 42 and the spring 41, as shown particularly in Figures 2 and 3, thence the conductors 53 extend upwardly through the tube comprising the arm 18. To assure maintaining the hinge friction member 43 in proper position, a cut away portion 56 is provided on the bracket hinge member 34 and a projection 57 from the hinge friction member 43 extends into the cut away portion 56 to prevent the hinge friction member 43 from rotating. It will be noted that the bracket hinge member 34 includes an integral half annulus 58. This falls outside of the ring hinge member 42 as shown clearly in Fig. 2 and its end portions define the limits of movement of the tube portion 44. As shown in Fig. 2, the portion of the device comprising the bracket 18, may be moved to the left so as to be slightly beyond the vertical or to the right to approximately reach a horizontal position.

A construction similar in principle, but differing in design, is utilized between the arms 17 and 18, as that previously described between the base and arm 18. The details of one suitable embodiment comprising a loaded hinge between the arms 17 and 18 are shown particularly in Figs. 5 and 6. Arm 17 has at its end a tube 59 integral with a ring hinge member 61. This ring hinge member is clamped between a bracket hinge member 62 and a hinge friction member 63. The bracket hinge member 62 is offset from a tube 64 supported at the upper end of the tube comprising the arm 18. A torsion spring 66 is disposed in the housing formed by the members described, one end thereof engaging a stop 67 carried by the ring hinge member 61 and the other extending inwardly to engage in a recess 68 carried by a portion of the bracket hinge member 62. A spring friction member 63 has an inwardly extending spring housing projection 69 within which is disposed a friction spring 71. A bolt 72 carried by the bracket hinge member 62 comprises a virtual pivot and a friction nut 73 threaded to the bolt 72 controls the compression of spring 71 and through it the friction between the ring hinge member 61 and those portions of the members 62 and 63 with which the same comes in contact.

A portion of the hinge friction member 63 is recessed as shown in Fig. 7 to permit passage of the conductors 53 around one edge of the ring hinge member 61, the conductors passing out of the tube comprising the arm 18 in the manner shown in Figs. 5 and 7 so as to extend into the open space between the ring hinge member 61 and the spring 66. Thence, as shown particularly in Fig. 5, the conductors 53 pass into the tube comprising the arm 17.

In the embodiment of the invention shown, the extending end of the arm 17 carries a lamp housing 16. The connection between the arm 17 and the lamp housing 16 may be made in various ways. In the drawings, I utilize a simple but adequate arrangement which permits a full adjustability of the position of the lamp housing.

The end of the tube comprising the arm 17 is formed outwardly at one portion to produce a projection 74. This projection rides in an annular groove 76 between a pair of bracket members 77 held together by a screw 78. A projection 79 from one of the bracket members 77 extends into the groove 76 and limits the rotational movement of the projection 74 within the said groove.

A ring 81 of a lamp housing supporting bracket is clamped between the bracket members 77, the parts being so constructed and arranged that a hinge action is permitted about a point comprising the center of a ring 81, but the bracket of which the ring 81 forms a part is otherwise supported firmly in position. This bracket comprises a tubular stem 82, extending through an aperture 83, of the stationary bracket 84 and a skirt portion 86 which rides on the top of a boss portion 87 of the said stationary bracket 84. A pin 88 extends into an annular groove adjacent the skirt 86, which annular groove is blocked at one point by projection 89, thus limiting the rotational movement between the two bracket portions referred to and, specifically, between the tubular extension 82 and the boss 87, to somewhat less than 360 degrees. The parts are held together by suitable means such as shown in the drawings, it being understood that the stationary bracket 84 may be suitably secured to the lamp housing 16 or may be formed as a part thereof, depending upon the manner of manufacture. The conductors 53 pass from the tube comprising the arm 17 to the lamp housing in the manner indicated in Figs. 5 and 6 and it will be noted particularly that a portion of the bracket members 77 is apertured to permit the conductors to pass around the ring 81. Each of the clamping members is provided with a rib 91, in the embodiment shown, to maintain the ring member 81 in position. This and other forms of construction may be employed without affecting the allowability to pass the conductor freely through the joint and in such a manner that breakage or excessive wear of the conductor insulation is avoided.

In the form of the device shown in Fig. 12, the housing for the power unit is not employed. The parts are substantially identical with the parts described in the previous embodiment and bear the same numbers as in the previous figures except that the prefix "1" is used in each instance. It will be noted that, instead of the ring housing 21 for the power unit, the upper projection 133 is supported directly upon boss 124 of the bracket 119, cap screws 128 being utilized for the purpose. A conductor 132 leads directly to a power consuming unit which would be supported on the end of the arm 17, in place of the luminescent lamp housing, said power consuming unit being, for example, an ordinary incandescent lamp or the like.

The features and advantages of my invention are believed to be obvious to those skilled in the art from the previous description and from a study of the drawings. Except for parts which are obviously fabricated by a drawing or similar operation, such as the tubes comprising the arms 17 and 18, most of the parts may be produced by die casting and require little work after being received from the mold. The springs 41 and 66 are selected so as to have approximately sufficient tension when mounted in position to carry the overhanging weight of the extending arm and it will be noted that in each instance, as the arm is moved in a direction to place a greater load on the spring, the spring is automatically placed in a better condition to carry the load by having a greater tension imparted to it. Thus, the parts are almost in balance at all times. To assure the maintaining of the parts, then, in the position to which they are moved, additional friction is provided at the joints carrying the springs 41 and 66, and this friction is controlled by controlling the position of the nuts 49 and 73, respectively. The hinge joint between the lamp housing 16 and the arm 17 carries very little, if any, unbalanced load and it is, therefore, unnecessary to provide a compensating counterbalance. With the compound movement permitted by the lamp housing 16 and the arm 17, the complete movement between the arms 17 and 18, on the one hand, and the arm 18 and its support on the other hand, together with the vertical pivot on which the entire assembly is supported, makes it possible to adjust the lamp housing to any position over a relatively large surface, and the balanced arrangement described makes it possible to move the parts with very little effort and assures the parts staying in the position to which they are adjusted. The device shown in Figure 1 may, for example, be mounted at an upper left hand corner of a relatively large drafting board and the lamp moved to any position on the board with the utmost ease as the designer or draftsman moves from one part of the board to the other for the purpose of doing his work.

Those skilled in the matters of design and manufacturing procedures will understand that the embodiment of the invention as disclosed in the drawings makes liberal use of mass production possibilities and particularly that most of the parts may be produced by die-casting techniques. The basic portion of the equipment may be retained, however, even when different manufacturing methods, and therefore different designs of parts, are used. The portion clampable to a desk or the like may comprise any suitable base, to which a lower support member (the lower portion of member 34) is secured by means of a vertical pivot. The arms are supported on horizontal pivots and the lamp housing on a universal joint. The terms vertical, horizontal and universal are not used in a rigorous sense but in a general sense to distinguish the types of movement at the several points of articulation.

The horizontal joints comprise, in effect, ring hinge members with clamping plates adjustable for clamping the edges of the ring to form a housing for the counter-balancing torsion spring, the clamping plates forming one hinge member and the ring the remaining hinge member. One of the clamping members is preferably made integral with one of the relatively movable members of the support structure and one removable as shown in the drawings, but modifications of this structure are contemplated by my invention. The clamping members should provide for passage of the conductor around the ring hinge member and the conductor is preferably provided with a compound loop (see Fig. 5) so that there is relatively little movement of the conductor and it will be protected against wear.

I have described my invention in detail so that those skilled in the art may understand the principles involved. It will be understood, however, that the features disclosed may be embodied in other forms and structures without departing from the spirit of the invention as set forth in the claims.

What I claim as new and desire to protect by Letters Patent of the United States is:

1. An adjustable support structure comprising a base, a lower support member carried thereby on a vertical pivot, a first arm pivoted to the said lower support member on a horizontal pivot, a second arm pivoted to the first arm by a horizontal pivot, each said horizontal pivot including a ring member and a pair of members clamping side edges of the ring member to form a housing, the said ring member moving with respect to said ring clamping members, and a torsion spring at each horizontal pivot supported in said housing and mounted to counterbalance that portion of the structure extensible from the remaining structure at each said horizontal pivot, said arms being hollow, one of each such pair of clamping members having an inner recess communicating with a hollow arm and a housing formed by the associated ring, whereby a conductor may extend through said rings, and, at each pivot, from an arm, through one of said recesses, and into the housing between the spring and ring portion of the pivot, defining approximately a 180° turn, the conductor being so positioned at the two horizontal pivots that the effective length of the conductor with respect to the support structure remains substantially unchanged.

2. An adjustable support structure for a lamp or the like, comprising a lower support member, having a plate like hinge member secured thereto, a hollow arm having a ring hinge member secured to one end thereof, the arm communicating with the inside of said ring, a separable hinge clamping plate, fastening means extending between said plate-like hinge member and clamping plate and holding them against side edges of said ring to form a housing, a torsion balancing spring disposed in said housing axial with the ring hinge member, one end of the spring secured to the said ring and one end to said plate like hinge member, and an electrical conductor extending through said lower support member, around said ring hinge member, into said housing between said ring and spring where it defines a 180 degree turn, and thence through said hollow arm.

3. An adjustable support structure for a lamp or the like, comprising a lower support member, having a plate like hinge member secured thereto, a hollow arm having a ring hinge member secured to one end thereof, the arm communicating with the inside of said ring, a separable hinge clamping plate, fastening means extending between said plate-like hinge member and clamping plate and holding them against side edges of said ring to form a housing, a torsion balancing spring disposed in said housing axial with the ring hinge member, one end of the spring secured to the said ring and one end to said plate like hinge member, said clamping plate being recessed at one point at the periphery of the said ring and an electrical conductor extending through said lower support member, between said ring and hinge clamping plate at said recess into said housing and between said ring and spring where it defines a 180 degree turn, and thence through said hollow arm, whereby the entire annulus comprising said ring, except where the hollow arm communicates therewith, may be imperforate.

4. An adjustable support structure for a lamp or the like, comprising a lower support member, having a plate like hinge member secured thereto, a hollow arm having a ring hinge member secured to one end thereof, the arm communicating with the inside of said ring, a separable hinge clamping plate, fastening means extending between said plate like hinge member and clamping plate and holding them against side edges of said ring to form a housing, a torsion balancing spring disposed in said housing axial with the ring hinge member, one end of the spring secured to the said ring and one end to said plate like hinge member, an electrical conductor extending through said lower support member, between said ring and hinge where it defines a 180 degree turn, and thence through said hollow arm, a second hollow arm having a ring hinge member, a ring hinge clamping plate carried by the first mentioned hollow arm, a separable ring hinge member clamping plate and a torsion spring in the housing formed by said ring hinge member and clamping plate, the said conductor extending through the second of such housings between the spring and said ring and through the said second hollow arm.

5. An adjustable support structure for a lamp or the like, comprising a lower support member, having a plate like hinge member secured thereto, a hollow arm having a ring hinge member secured to one end thereof, the arm communicating with the inside of said ring, a separable hinge clamping plate, fastening means extending between said plate-like hinge member and clamping plate and holding them against side edges of said ring to form a housing, a torsion balancing spring disposed in said housing axial with the ring hinge member, one end of the spring secured to the said ring and one end to said plate like hinge member, and an electrical conductor extending through said lower support member, between said ring and hinge where it defines a 180 degree turn, and thence through said hollow arm, said fastening means comprising a spring to resiliently clamp said hinge clamping members against said ring.

IRVING FIORI.